(12) United States Patent
Zhou et al.

(10) Patent No.: US 11,869,322 B2
(45) Date of Patent: Jan. 9, 2024

(54) INTELLIGENT VIDEO PROCESSING APPARATUS

(71) Applicant: Huawei Technologies Co., Ltd., Shenzhen (CN)

(72) Inventors: Yan Zhou, Shanghai (CN); Aijun Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/689,346

(22) Filed: Mar. 8, 2022

(65) Prior Publication Data
US 2022/0198894 A1    Jun. 23, 2022

Related U.S. Application Data

(63) Continuation of application No. 17/010,158, filed on Sep. 2, 2020, now Pat. No. 11,282,355, which is a continuation of application No. PCT/CN2019/074774, filed on Feb. 11, 2019.

(30) Foreign Application Priority Data

Mar. 27, 2018  (CN) .......................... 201810258526.8

(51) Int. Cl.
G08B 13/19        (2006.01)
G06N 3/08         (2023.01)
G08B 13/196       (2006.01)

(52) U.S. Cl.
CPC ........... *G08B 13/1966* (2013.01); *G06N 3/08* (2013.01); *G08B 13/19623* (2013.01); *G08B 13/19656* (2013.01); *G08B 13/19667* (2013.01)

(58) Field of Classification Search
USPC ......................................................... 348/143
See application file for complete search history.

(56) References Cited

U.S. PATENT DOCUMENTS

| | | | |
|---|---|---|---|
| 2009/0221234 A1 | 9/2009 | Pirzada et al. | |
| 2011/0211036 A1* | 9/2011 | Tran ...................... | G06N 3/084 348/E7.083 |
| 2013/0014221 A1* | 1/2013 | Moore .................... | G06F 21/57 726/3 |
| 2013/0096906 A1* | 4/2013 | Niemeyer ............... | G06F 9/455 703/23 |
| 2017/0185871 A1 | 6/2017 | Zhang et al. | |

FOREIGN PATENT DOCUMENTS

| | | | |
|---|---|---|---|
| CN | 101431673 A | 5/2009 | |
| CN | 101576826 A | 11/2009 | |
| CN | 102970516 A | 3/2013 | |
| CN | 104038720 A | 9/2014 | |
| CN | 104168172 A | 11/2014 | |
| CN | 104320611 A | 1/2015 | |
| CN | 106817562 A | 6/2017 | |
| CN | 106934426 A | 7/2017 | |
| CN | 107483876 A | 12/2017 | |

* cited by examiner

*Primary Examiner* — Mikhail Itskovich
(74) *Attorney, Agent, or Firm* — Conley Rose P.C.

(57) ABSTRACT

A camera includes an image processor configured to generate an image or a video data, an intelligent processor configured to perform intelligent analysis and to process on the image or the video data, and a communications interface configured to receive, from an external device, configuration information for the camera, where the configuration information extends a function of the camera.

20 Claims, 10 Drawing Sheets

INTELLIGENT VIDEO PROCESSING APPARATUS

CROSS-REFERENCE TO RELATED APPLICATIONS

This is a continuation of U.S. patent application Ser. No. 17/010,158 filed on Sep. 2, 2020, which is a continuation of International Patent Application No. PCT/CN2019/074774 filed on Feb. 11, 2019, which claims priority to Chinese Patent Application No. 201810258526.8 filed on Mar. 27, 2018. All of the aforementioned patent applications are hereby incorporated by reference in their entireties.

TECHNICAL FIELD

The present disclosure relates to the video surveillance field, and in particular, to a definable intelligent video processing apparatus.

BACKGROUND

Currently, with development of video surveillance technologies, surveillance develops from simple video recording to intelligence. This trend of intelligence also significantly affects development of front-end cameras. Currently, cameras present a trend of increasing intelligence. In addition, based on rapid development of technologies such as computer vision and deep learning in recent years, intelligent cameras have surpassed human beings in accuracy of automatic recognition. With application of the intelligent cameras, surveillance efficiency is improved, and labor costs are greatly reduced, thereby essentially promoting modernization and intelligence progresses such as a safe city and a smart city.

Although current intelligent cameras can implement some intelligent analysis functions, manufacturers usually need to develop different types of intelligent cameras for different application scenarios, and implemented intelligent analysis functions are also different. Algorithms used for different application scenarios are different, and manufacturers provide implementation methods only of their own. Therefore, these intelligent cameras usually cannot be used universally. Due to this incompatibility, users need to purchase corresponding types of intelligent cameras for different application scenarios, thereby increasing burden of the users.

SUMMARY

An embodiment of the present disclosure provides a definable intelligent video processing apparatus. On a basis of an intelligent analysis function of a conventional intelligent video processing apparatus, the intelligent video processing apparatus can further allow a user to develop and extend software and/or hardware for functions of the intelligent video processing apparatus according to a requirement of an actual application scenario, to improve universality of the intelligent video processing apparatus and extend application scenarios of the intelligent video processing apparatus.

To achieve the foregoing objective, the intelligent video processing apparatus provided in this embodiment of the present disclosure includes an image obtaining module configured to receive image or video data, an intelligent module, connected to the image obtaining module and configured to perform intelligent analysis and processing on the obtained image or video data, and a communications module configured to communicate with an external device, where the communications module may receive, from the external device, configuration information for the intelligent video processing apparatus, and the configuration information is used to extend functions of the intelligent video processing apparatus. The intelligent video processing apparatus provided in this embodiment of the present disclosure can receive the configuration information for the apparatus from the external device, and perform corresponding operations based on the received configuration information to implement different functions. A user or a manufacturer can write different configuration information into the intelligent video processing apparatus according to a requirement of an application scenario. This improves universality of the intelligent video processing apparatus, and avoids developing different video processing apparatuses based on different application scenarios.

The configuration information may include at least one of a deep learning-based neural network model, intelligent video analysis algorithm code applicable to a specific application scenario, location topology information and control information for multi-camera cooperation, a security control list, and a control action indication. A user or a manufacturer may select to-be-written configuration information according to a requirement of a scenario. Configuration information supported by the intelligent video processing apparatus provided in this embodiment of the present disclosure is not limited to the foregoing listed types.

The communications module in the intelligent video processing apparatus provided in this embodiment of the present disclosure may be at least one of a wireless communications module and a fixed communications module, and a suitable communication mode may be flexibly selected according to a requirement of an application scenario.

In a possible implementation, the intelligent video processing apparatus further includes a security and management module configured to manage data and system security of the intelligent video processing apparatus. The security and management module stores a security control list. The security control list is a management list of the intelligent video processing apparatus for external devices, and includes information about an external device allowed to access system data of the intelligent video processing apparatus. At least one security control point is set in a data transmission path of the intelligent video processing apparatus, to perform authentication on transmitted data. With the setting of the security control list and the security control point, authentication may be performed on data to be transmitted to an external device and an external operation on a system, to prevent data from being transmitted to an unauthorized device or prevent the intelligent video processing apparatus from being illegally hijacked.

In a possible implementation, the intelligent video processing apparatus provided in the present disclosure may further support extension of a new hardware module as required. The intelligent video processing apparatus includes an extension interface configured to connect at least one extension module and implement communication between the intelligent video processing apparatus and the extension module. Duplex communication and control may be implemented between the intelligent video processing apparatus and the extension module. The extension module may be a new communications module, a new storage module, or a new intelligent module. The extension module may be selected according to a requirement of an actual scenario. With the setting of the extension interface, the intelligent video processing apparatus can support extension of a new module. This improves performance of the intelligent video processing apparatus such that the intelligent video processing apparatus can implement more different scenarios.

In a possible implementation, a hardware/software driver of the at least one extension module is installed in a system of the intelligent video processing apparatus such that the extension module becomes a part of the intelligent video processing apparatus.

In a possible implementation, an application programming interface (API) layer is provided on the intelligent video processing apparatus. The hardware/software driver of the extension module is adapted in the API layer such that the extension module can access the intelligent video processing apparatus and/or control another extension module.

In a possible implementation, the extension module stores algorithm code developed for a specific video surveillance scenario. On a basis of an original intelligent video processing apparatus, corresponding extension modules are added for different surveillance scenarios. This improves universality of the intelligent video processing apparatus, without a need of developing different types of intelligent video processing apparatuses for different surveillance scenarios, and therefore can significantly reduce development costs.

In a possible implementation, the image obtaining module in the intelligent video processing apparatus includes a lens, an image collection module, and an image processing module. In this case, the intelligent video processing apparatus is an intelligent camera. Compared with a conventional camera, the intelligent camera is definable and extensible, and new functions may be extended based on different application scenarios.

The intelligent video processing apparatus provided in this embodiment of the present disclosure allows a user to input different configuration information as required, and supports extension of a new hardware module. According to the intelligent video processing apparatus provided in this embodiment of the present disclosure, on a basis of implementing a basic intelligent analysis function, another function can be extended according to a specific requirement of a user, and a plurality of new hardware modules can be extended as required, thereby providing an open and extensible intelligent video processing apparatus. Therefore, a user can autonomously develop an intelligent analysis application according to a specific requirement, and choose to extend new modules based on different application scenarios. This improves compatibility of the intelligent video processing apparatus and enlarges an application scope of the apparatus.

These aspects or other aspects of the present disclosure are clearer and more comprehensible in descriptions of the following embodiments.

DESCRIPTION OF EMBODIMENTS

The following describes the technical solutions in the embodiments of the present disclosure with reference to the accompanying drawings in the embodiments of the present disclosure. A specific operation method in a method embodiment may also be applied to an apparatus embodiment.

Currently, video surveillance is widely applied to industrial, security, daily life, and other fields, and video surveillance cameras are constantly developing towards intelligence. Currently, an intelligent camera is applicable only to a specific application scenario, and the intelligent camera is also developed for a specific purpose. Intelligent cameras with different functions need to be implemented for different surveillance scenarios, but cannot be used universally, thereby resulting in incompatibility. In this case, development costs of intelligent cameras are huge, and developed intelligent cameras are incompatible. Therefore, to resolve problems, such as incompatibility and a limited computing capability, of an existing intelligent camera, an embodiment of this application provides a definable intelligent video processing apparatus, allowing a user to develop and extend software and/or hardware for functions of the intelligent video processing apparatus according to a requirement of an actual application scenario in order to improve universality of the intelligent video processing apparatus.

Figure 1:
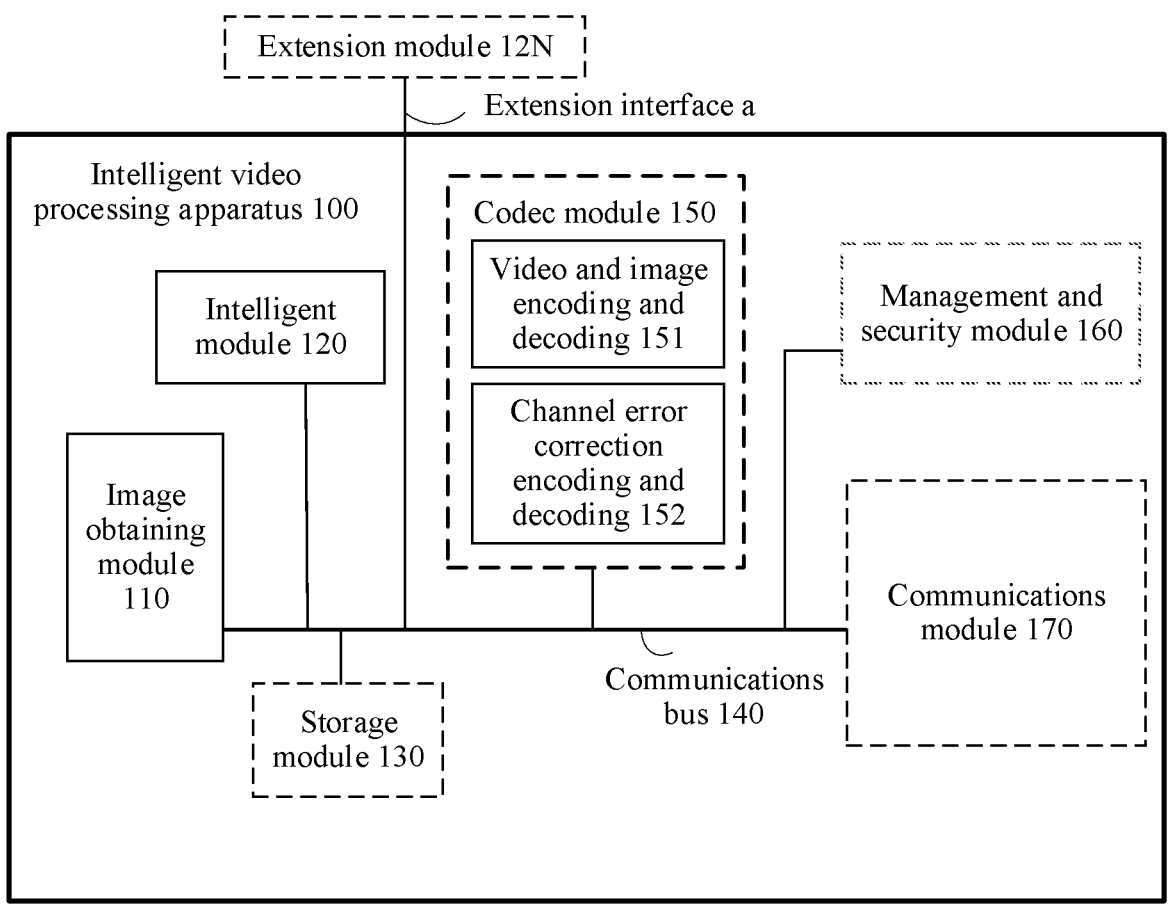
FIG. 1 is a schematic structural diagram of a possible intelligent video processing apparatus according to an embodiment of the present disclosure.

FIG. 1 is a schematic structural diagram of a possible intelligent video processing apparatus according to an embodiment of the present disclosure. The intelligent video processing apparatus includes an image obtaining module 110, an intelligent module 120, and a communications module 170. Other modules or components are optional in this embodiment of the present disclosure.

The image obtaining module 110 in the intelligent video processing apparatus 100 provided in this embodiment of the present disclosure is configured to obtain image and/or video data for processing and analysis by the intelligent video processing apparatus. A manner of obtaining an image by the image obtaining module 110 varies based on different application scenarios. In a scenario, the intelligent video processing apparatus 100 may be connected to various different front-end devices. A front-end device may transmit collected image/video data to the intelligent video processing apparatus 100 for further analysis and processing. In this case, a physical form of the image obtaining module 110 may be an interface connected to the front-end device. The following provides several specific application scenarios of the intelligent video processing apparatus 100 provided in this embodiment of the present disclosure.

Scenario 1: In some application scenarios of an access control camera, an access control system also needs to have functions such as face detection and alarms. In this case, based on different accuracy and target scopes required for detection, a corresponding intelligent video processing apparatus 100 may be provided, and targeted application development is performed. In this case, the access control camera and the corresponding intelligent video processing apparatus 100 are combined into an intelligent access control system that can implement more functions.

Scenario 2: The intelligent video processing apparatus 100 is externally connected to a mobile phone terminal. As a front-end image/video obtaining device, the mobile phone terminal cooperates with the intelligent video processing apparatus 100 to form an intelligent surveillance system with a larger capacity and capable of real-time recording and analysis. Flexibility of obtaining an image/video by the intelligent video processing system together with the mobile phone greatly extends application scenarios of intelligent video surveillance.

Scenario 3: A special front-end device is usually applicable to surveillance in a specific scenario, and has a specific sensor (a smoke, infrared, humidity, or black light sensor, or the like) and functions such as vibration and audible and visual alarms. According to a requirement of public security or another application scenario, the special front-end device is connected to the intelligent video processing apparatus 100, and a corresponding application is developed, to implement rapid local analysis by the special front-end device. The special front-end device and the intelligent video processing apparatus 100 together form an intelligent front-end video analysis system.

In the foregoing scenarios, an interface for connecting the front-end device to the intelligent video processing apparatus 100 may be in a wired or wireless communication mode. The wired mode may include a mode such as a Transmission Control Protocol (TCP)/Internet Protocol (IP) communications technology or a User Datagram Protocol (UDP) technology of Ethernet technologies, a standard Universal Serial Bus (USB) port or Component Object Model (COM) interface, or another similar standard port. The wireless communication mode may include technologies such as Wi-Fi, BLUETOOTH, ZIGBEE, or ultra-wideband (UWB). A corresponding connection mode may be selected based on an actual application scenario and a hardware form of the front-end device.

Figure 2:
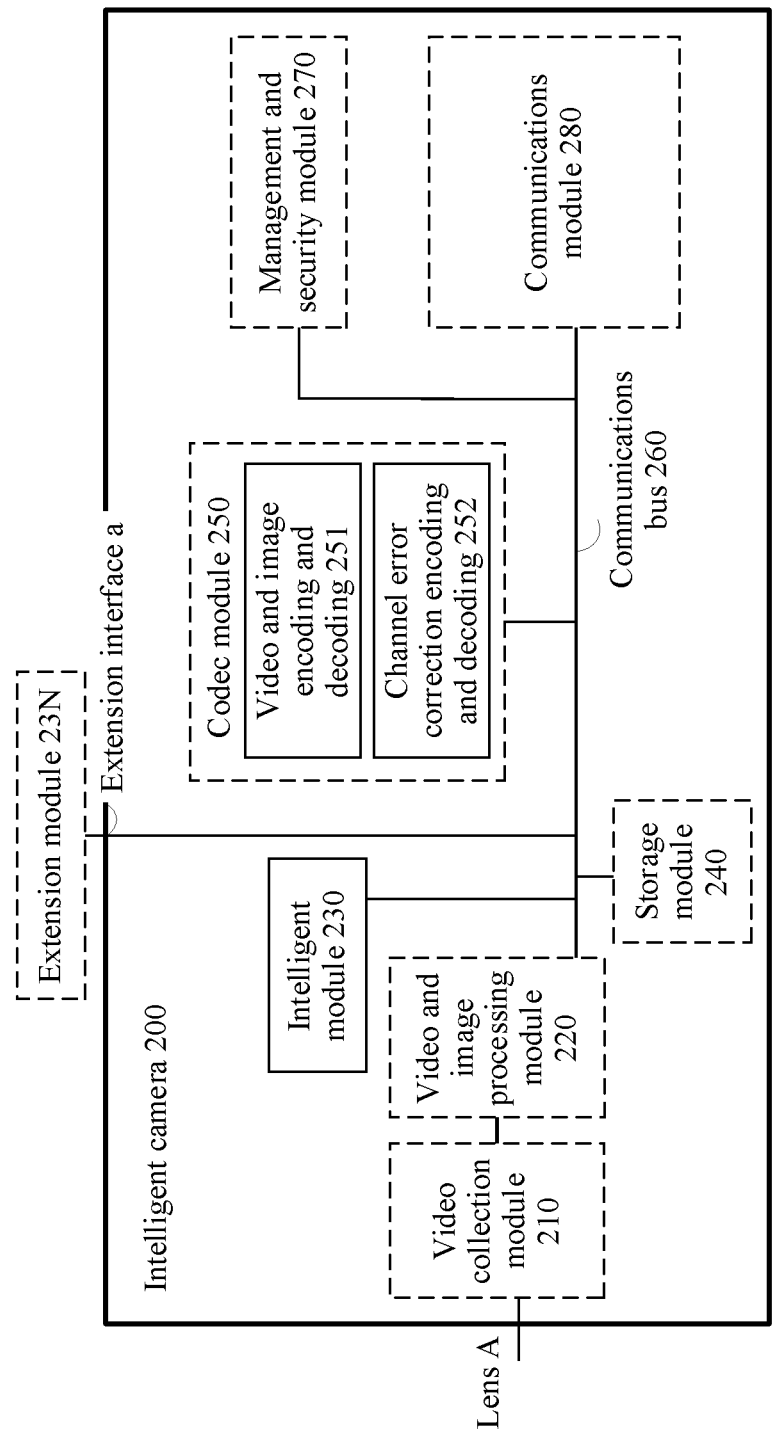
FIG. 2 is a schematic structural diagram of another possible intelligent video processing apparatus according to an embodiment of the present disclosure.

In another application scenario, a lens is disposed on the intelligent video processing apparatus 100 to collect image and/or video data. In this case, the image obtaining module 110 may be a collective name of the lens, an image collection module, and an image processing module. In this case, the intelligent video processing apparatus is presented as a special definable intelligent camera. FIG. 2 is a schematic structural diagram of a definable intelligent camera 200 according to an embodiment of the present disclosure. The intelligent camera 200 integrates a common camera for directly collecting image and/or video data with the intelligent video processing apparatus 100, to form the definable intelligent camera 200 that can not only collect image/video data and intelligently process video data, but also support voluntarily defining an intelligent analysis algorithm according to an actual requirement. The definable intelligent camera 200 provided in this embodiment of the present disclosure is a combination of an existing common camera and the intelligent video processing apparatus 100. Main components of the definable intelligent camera 200 are basically similar to those of the intelligent video processing apparatus 100. Three components, that is, a lens A, an image collection module 210, and an image processing module 220, correspond to the image obtaining module 110 in the intelligent video processing apparatus 100, and are configured to collect image and/or video data. The lens A may be of a fixed-aperture, auto-iris, auto-zoom, or the like. The image collection module 210 is configured to record a captured optical signal. The image collection module 210 is usually any type of optical sensor, for example, a complementary metal-oxide-semiconductor (CMOS), a charge-coupled device (CCD), or a device implementing a similar function.

Optionally, in some scenarios, the image collection module 210 collects an unprocessed video stream, and needs to use the image processing module 220 to process the video stream. The image processing module 220 usually has functions such as analog-to-digital (A/D) conversion, signal processing, and image zooming. A/D conversion and signal processing technologies are well-known by a skilled person. In some embodiments, for example, when the video collection module 210 in the intelligent camera 200 is the CMOS sensor, the video collection module can implement the A/D conversion function. Therefore, the image processing module 220 does not need to have an A/D conversion function. A result obtained through A/D conversion and signal processing is digital image data. According to an embodiment, before the digital image data is sent to an intelligent module 230, the video and image processing module 220 processes the digital image data to obtain at least one image with a specific size. In another embodiment, no zooming or size adjustment needs to be performed on an image and/or a video from a front end.

The intelligent module 120 in the intelligent video processing apparatus 100 provided in this embodiment of the present disclosure is mainly configured to perform intelligent analysis and processing on received video or image data, and manage and control other modules in the intelligent video processing apparatus 100. The intelligent module 120 may perform a corresponding operation and implement a corresponding function based on configuration information sent from the outside.

The intelligent analysis and processing performed by the intelligent module 120 can generate a complete determining result of an abnormal event that occurs in a monitored scenario. Another back-end device of a video surveillance system does not need to perform post-processing on the complete determining result. The complete determining result can provide complete information related to the abnormal event. The intelligent module 120 processes and analyzes a video at a front end, thereby processing the video in a more timely manner. In addition, this avoids transmitting all video data to a back-end device for processing, thereby saving bandwidth.

The intelligent module 120 may be a processor or a controller, for example, may be a central processing unit (CPU), a general purpose processor, an artificial intelligence (AI) chip, a graphics processing unit (GPU), a digital signal processor (DSP), an application-specific integrated circuit (ASIC), a field-programmable gate array (FPGA) or another programmable logic device, a transistor logic device, a hardware component, or any combination thereof. The processor may be alternatively a combination that implements a computing function and/or a control function. For example, the processor includes a combination of one or more microprocessors, a combination of a DSP and a microprocessor, or a combination of a CPU and a GPU or an AI chip.

The communications module 170 is configured to receive, from an external device definition content, namely, configuration information for the intelligent video processing apparatus 100, and is further configured to send data of the intelligent video processing apparatus 100 to an external device. The configuration information is used to extend functions that can be implemented by the intelligent video processing apparatus 100. After receiving the configuration information, the intelligent video processing apparatus 100 may parse the received configuration information, and perform a corresponding operation based on content of the configuration information to implement a function of the configuration information. The configuration information herein may include intelligent video analysis software or algorithm code developed for various video surveillance application scenarios, or may include a deep learning-based neural network model, or an algorithm and control information that require multi-camera cooperation in some application scenarios, or may be control information or the like for internal data security of the intelligent video processing apparatus 100.

A user or a device manufacturer may write, from the communications module 170 into the intelligent video processing apparatus, video processing software or a video processing algorithm that is developed based on a specific application scenario, or other control information such that the intelligent video processing apparatus can meet a requirement of the application scenario, thereby implementing function extensibility of the intelligent video processing apparatus.

The communications module 170 may also be configured to warn and notify a remote user of some key recognition results of the intelligent video processing apparatus 100 in a timely manner, including triggering an short message service (SMS) message, or triggering some necessary camera-network cooperation actions such as authentication on a risky operation.

The communications module 170 in this embodiment of the present disclosure may be a wireless communications module, including a signaling-plane protocol stack for transmitting signaling and a user-plane protocol stack for transmitting data. The communications module 170 in this embodiment of the present disclosure may be alternatively a fixed communications module, including a management port for transmitting control information and a data transfer port for transmitting data.

In a specific implementation, the wireless communications module may be a Wi-Fi chip, a ZIGBEE chip, a BLUETOOTH chip, or a baseband chip supporting second generation (2G)/third generation (3G)/fourth generation (4G)/fifth generation (5G), and the fixed communications module may be a component supporting an asymmetric digital subscriber line (ADSL), an x passive optical network (xPON), a packet transport network (PTN), or another wired access technology. With network evolution and technology development, another access mode may also emerge. The wireless communications module or the fixed communications module may be a component supporting the other access mode. This is not limited herein. The communications module 170 in the intelligent video processing apparatus 100 may be selected according to a requirement of an application scenario. A wireless communications module, or a fixed communications module, or both a wireless communications module and a fixed communications module may be installed on the intelligent video processing apparatus 100.

Optionally, the intelligent video processing apparatus 100 provided in this embodiment of the present disclosure may further include a codec module 150. The codec module 150 may be configured to encode the digital image data into any one of a plurality of known formats for a continuous video sequence, a limited video sequence, a static image, or an image/video stream. For example, image information may be encoded into a Moving Picture Experts Group (MPEG)1, MPEG2, MPEG4, Joint Photographic Experts Group (JPEG), or Motion JPEG (MJPG) format, or a bitmap, and then transmitted out. The codec module 150 is further configured to perform channel error correction encoding and decoding on data in communication with an external device, to reduce a bit error rate and data errors. The codec module 150 may be further configured to perform feedback encoding based on a network quality condition (bandwidth, a jitter, a latency, or the like) of an output interface, and can adaptively select a suitable encoding scheme based on current network quality. Optionally, a codec function may be alternatively integrated in the intelligent module 120.

Optionally, the intelligent video processing apparatus 100 provided in this embodiment of the present disclosure may further include a storage module 130 configured to store program code that needs to be executed by the intelligent video processing apparatus 100 to perform intelligent analysis, and received video or image data. According to a requirement of an actual application scenario, the storage module 130 in the intelligent video processing apparatus 100 provided in this embodiment of the present disclosure is extensible. At least one storage module may be extended through an extension interface a as required. The memory 130 may be a read-only memory (ROM), another type of static storage device that can store static information and an instruction, a random-access memory (RAM), another type of dynamic storage device that can store information and an instruction, an electrically erasable programmable ROM (EEPROM), a compact disc (CD) ROM (CD-ROM), another optical disc storage, an optical disc storage (including a compact optical disc, a laser disc, an optical disc, a digital versatile disc (DVD), a BLU-RAY DISC, and the like), a magnetic disk storage medium, another magnetic storage device, or any other medium that can carry or store expected program code in an instruction or data structure form and can be accessed by a computer. However, this application is not limited thereto.

Different from an existing intelligent video analysis device, the intelligent video processing apparatus 100 provided in this embodiment of the present disclosure is definable and extensible. Scenarios in actual application vary greatly, and required video processing also varies. The intelligent video processing apparatus in this embodiment of the present disclosure can support re-defining the intelligent video processing apparatus, but is not limited to a specific application scenario. A device manufacturer or a user may write, into the intelligent video processing apparatus 100 using the communications module 170, an application or an algorithm customized for a specific application scenario.

Figure 3:
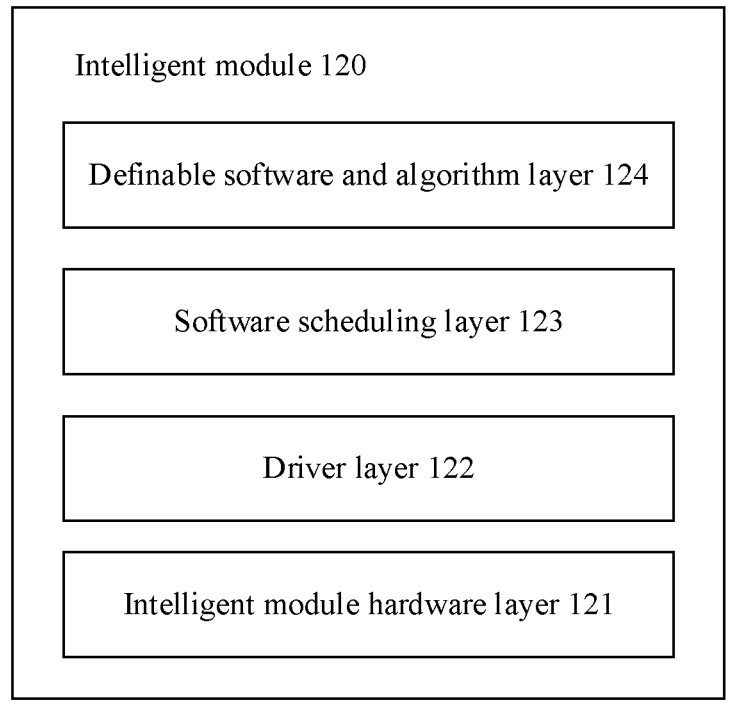
FIG. 3 is a schematic diagram of a system architecture of an intelligent module according to an embodiment of the present disclosure.

To make the intelligent video processing apparatus 100 provided in this embodiment of the present disclosure definable, an embodiment of this application provides a definable intelligent module 120. As shown in FIG. 3, the intelligent module 120 in this embodiment of the present disclosure may be divided into four layers from hardware to software an intelligent module hardware layer 121, a driver layer 122, a software scheduling layer 123, and a definable software and algorithm layer 124.

The intelligent module hardware layer 121 is a hardware entity of the intelligent module 120. As mentioned above, a most basic function of the intelligent module 120 is to implement computing and control functions, and may be implemented by different hardware, for example, a CPU, a DSP, an ASIC, or an FPGA. Flexible selection may be performed according to a requirement of an actual scenario.

A corresponding driver needs to be installed such that the intelligent module 120 can be connected to a system of the intelligent video processing apparatus 100 and operate properly. The driver layer 122 includes all drivers required for supporting a connection of the intelligent module 120 to the system of the intelligent video processing apparatus 100 and ensuring proper operating of the intelligent module 120. After the corresponding driver is installed, the system may control and invoke the intelligent module 120, to implement a function of the intelligent module 120.

The software scheduling layer 123 is configured to during operating of the intelligent module 120, implement coordination and invocation between various programs running on the intelligent module 120. In some application scenarios, a plurality of programs may run, but the intelligent module 120 has limited operation resources. Therefore, the software scheduling layer 123 needs to coordinate a running sequence of the programs.

The definable software and algorithm layer 124 is a collective name of executable software and algorithms in the intelligent module 120. A user may write corresponding software and algorithms into the intelligent module 120 based on different application scenarios. In addition, mutual invocation between application software or algorithms at the definable software and algorithm layer 124 is further supported. To be specific, software or an algorithm may release a function block that can be implemented by the software or the algorithm, and other software or algorithms may use the function block released by the software or the algorithm. This invocation mechanism of application software and algorithms enables a user to conveniently replace a software or an algorithm at the definable software and algorithm layer based on an application scenario.

With the setting of the foregoing four layers, the intelligent video processing apparatus 100 can be definable. Required configuration information may be written into the intelligent video processing apparatus 100 based on different application scenarios, thereby extending universality and an application scope of the intelligent video processing apparatus 100.

An extension interface a is further disposed in the intelligent video processing apparatus 100 provided in this embodiment of the present disclosure. When a hardware capability of the intelligent video processing apparatus 100 is insufficient to meet a requirement of an application scenario, a user may extend a new hardware module for the intelligent video processing apparatus 100 using the extension interface a to meet a computing requirement. An extension module in this embodiment of the present disclosure may be a new communications module, a new storage module, a new intelligent module, or the like.

In some scenarios, a communications module in an original intelligent video processing apparatus may support only wired communication. When communication in a wired communications network is congested or interrupted, a new communications module may be extended using the extension interface. The extended communications module is a communications module supporting wireless communication. Further, the extended communications module may support a communication mode such as Wi-Fi communication, ZIGBEE communication, BLUETOOTH communication, or 2G/3G/4G/5G.

In some scenarios, an intelligent video processing apparatus needs to store more image data, but an original intelligent video processing apparatus is unable to support this requirement. In this case, more storage modules may be extended using the extension interface to improve a storage capability of the intelligent video processing apparatus. An extended storage module may be a ROM, another type of static storage device that can store static information and an instruction, a RAM, another type of dynamic storage device that can store information and an instruction, an EEPROM, a CD-ROM, another optical disc storage, an optical disc storage (including a compact optical disc, a laser disc, an optical disc, a DVD, a BLU-RAY DISC, and the like), a magnetic disk storage medium, another magnetic storage device, or any other medium that can carry or store expected program code in an instruction or data structure form and can be accessed by a computer. However, this application is not limited thereto.

In some other application scenarios, an extension module 12N may be an intelligent module that stores an application or an algorithm developed for a specific application scenario. An intelligent video processing apparatus 100 on which the extension module is installed is applicable to the corresponding specific application scenario, without a need of secondary development. Alternatively, the extension module may be simply a module providing a computing capability for the intelligent video processing apparatus 100, and performs computing under control of the intelligent module 120. Regardless of which type of intelligent module is extended, a user may perform secondary development on the intelligent video processing apparatus 100 using the communications module 170 such that the intelligent module 120 and the extension module 12N complete an application or computing that is defined by the user. Optionally, the extended module may be an embedded microprocessor, a general purpose processor, a DSP, an ASIC, an FPGA or another programmable logic device, a transistor logic device, or a hardware component, or may be an AI chip, a GPU, or another intelligent processor, or may be any combination of the foregoing components.

In terms of control, the intelligent module 120 in the intelligent video processing apparatus 100 provided in this embodiment of the present disclosure controls other modules. Alternatively, optionally, after an extension module is added, after authorization by the intelligent video processing apparatus 100, one extension module 12N may control other modules. According to this embodiment of the present disclosure, by disposing a relay station (for example, a hub) in the extension module 12N, the extension module 12N can be used as a part of the entire intelligent video processing apparatus 100, but not merely as a peripheral component of the intelligent video processing apparatus 100.

In terms of software/hardware installation and connections, a specific standard and/or protocol may be used for the intelligent video processing apparatus 100 provided in this embodiment of the present disclosure, to install the extension module 12N on the intelligent video processing apparatus 100. Further, an API layer is provided on the intelligent video processing apparatus 100. A hardware/software driver of the new extension module 12N is installed at the API layer in the system of the intelligent video processing apparatus 100, to implement control of the intelligent module 120 on the extension module 12N and mutual data transmission. In addition, the extension module may alternatively access the intelligent module 120 using software and control the entire system of the intelligent video processing apparatus 100. The extension interface a in the intelligent video processing apparatus 100 is configured to provide a connection interface for the extension module 12N and the intelligent video processing apparatus 100 such that the intelligent video processing apparatus 100 can communicate with the extension module 12N using the extension interface a. In terms of a hardware interface, the extension interface a may be in a wired or wireless form, and may be disposed separately, or may be integrated in the communications module 170. The extension interface a may use a technology such as TCP/IP or UDP, or may be a standard file transfer interface, for example, an integrated drive electronics (IDE), Peripheral Component Interconnect (PCI)/PCI Express (PCI-E), Small Computer System Interface (SCSI), USB, or Serial Advanced Technology Attachment (SATA) interface, or may use a wireless communications technology such as WI-FI, ZIGBEE, or BLUETOOTH. Flexible selection may be performed based on different application scenarios. This is not limited herein in the present disclosure.

In terms of a power supply, the extension module 12N may be powered by the intelligent video processing apparatus 100, or may be powered by an extension module with a power supply function. In addition, all modules (including the extension module 12N) may have a standby function, and the intelligent module 120 may alternatively control a power supply for other modules (including the extension module 12N). A driver installed in the system of the intelligent video processing apparatus may include power supply control information of the extension module 12N.

In addition, the intelligent video processing apparatus 100 provided in this embodiment of the present disclosure can allocate a required intelligent analysis function to an extended module for implementation. This maximally relieves computing pressure of the intelligent video processing apparatus 100 such that a basic function and hardware of the intelligent video processing apparatus 100 are greatly simplified, and a size of the intelligent video processing apparatus 100 can be reduced.

The following provides some examples of the definable intelligent camera 200 and the intelligent video processing apparatus 100 provided in the embodiments of the present disclosure, to further illustrate features of the present disclosure. A mode of a connection between the intelligent video processing apparatus and an extension module is mainly shown.

Example 1

Figure 4:
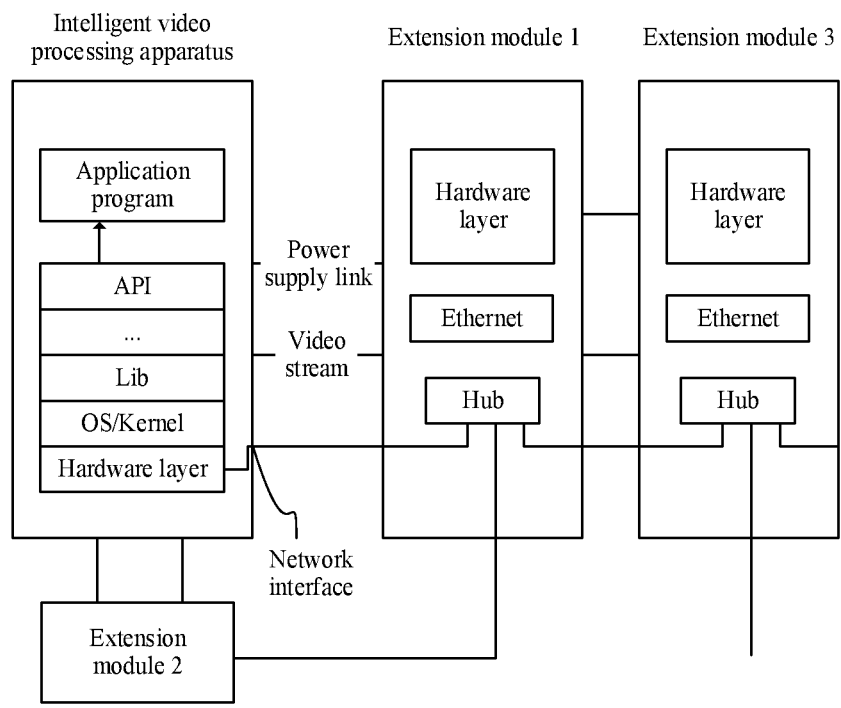
FIG. 4 is a schematic diagram of a connection between an intelligent video processing apparatus and an extension module according to an embodiment of the present disclosure.

FIG. 4 shows a data transmission mode and a module control method in which a TCP/IP communications technology of Ethernet technologies is used. As shown in FIG. 4, data is transmitted between the intelligent video processing apparatus 100 and the extension module 12N using the TCP/IP technology of Ethernet technologies. In addition, using a hub in the extension module 12N, the extension module 12N may be used as a node in the intelligent camera 200 or the intelligent video processing apparatus 100. This can implement a free connection between extension modules.

As shown in FIG. 4, the extension interface a on the intelligent video processing apparatus 100 has several interface layers, including an API layer. When a new extension module 12N is connected, using the API layer, the intelligent video processing apparatus 100 receives an installation program for the extension module using an Ethernet transmission technology, identifies the extension module 12N, and installs a driver of the extension module 12N in the system of the intelligent video processing apparatus such that the intelligent module can control the extension module 12N. Moreover, in addition to the TCP/IP technology, data transmission between the intelligent video processing apparatus 100 and the extension module 12N may be alternatively implemented using another technology such as a UDP technology.

Example 2

Figure 5:
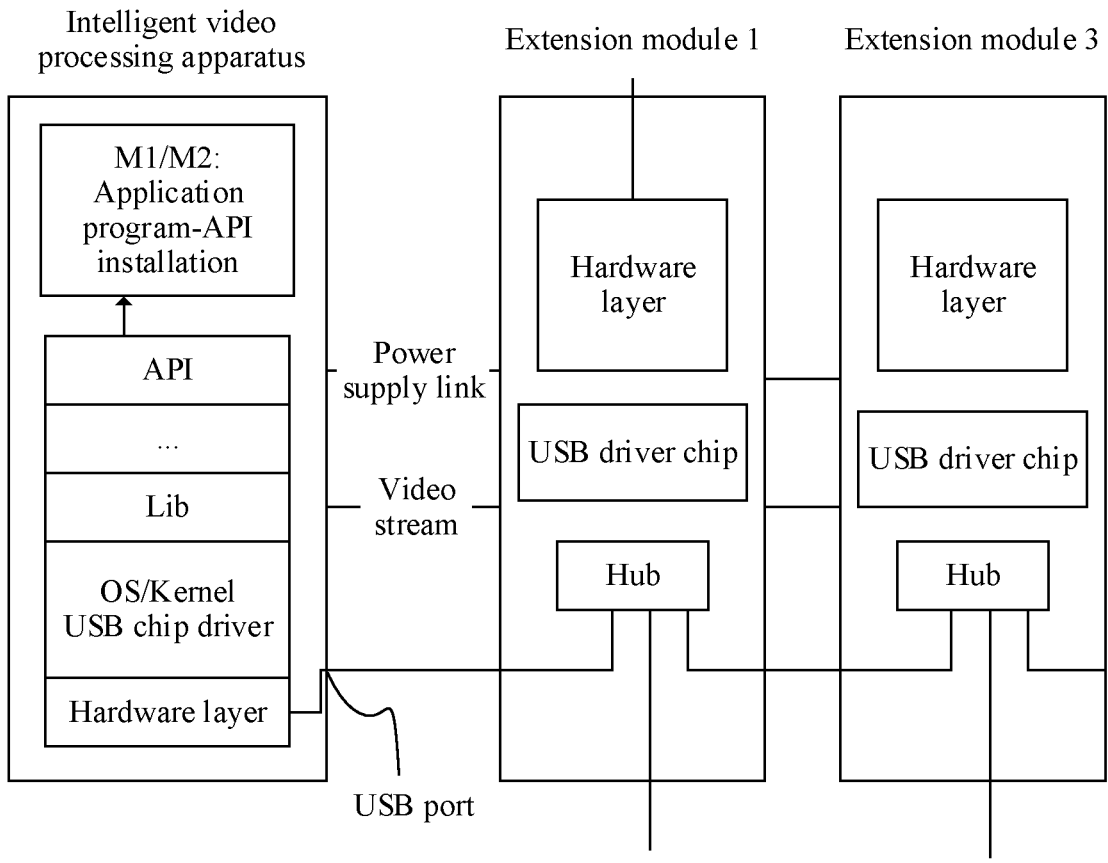
FIG. 5 is a schematic diagram of another connection between an intelligent video processing apparatus and an extension module according to an embodiment of the present disclosure.

FIG. 5 shows a method for implementing data transmission and module control between the intelligent video processing apparatus 100 and the extension module 12N using a standard USB port. As shown in FIG. 5, the extension interface a on the intelligent video processing apparatus 100 has several interface layers, including an operating system (OS)/Core interface layer. A USB chip driver is pre-installed at the OS/Core interface layer, and a USB chip is disposed in the extension module. Therefore, when a new extension module 12N is connected, the intelligent video processing apparatus 100 identifies and drives a USB chip in the extension module 12N using a USB chip driver at the OS/Core interface layer, converts data of the extension module into data that can be identified by the intelligent video processing apparatus 100, and receives a data stream from the extension module 12N and/or sends data to the extension module, to control the extension module. In addition, using a hub in the extension module 12N, the extension module 12N may be used as a node in the intelligent video processing apparatus 100. This can implement a free connection between extension modules. In addition to the standard USB port, data transmission between the intelligent video processing apparatus 100 and the extended module 12N may be alternatively implemented using another standard port with a similar chip.

Example 3

Figure 6:
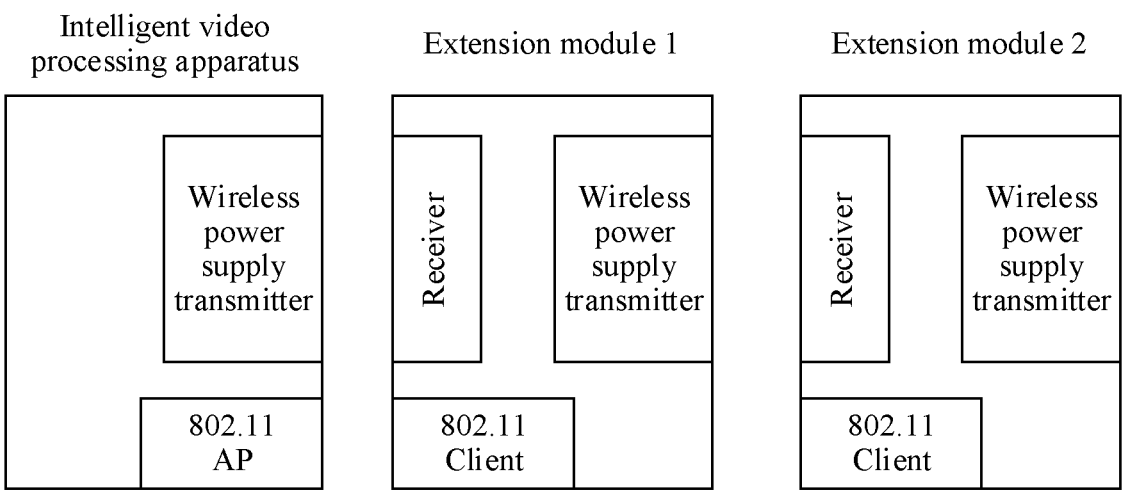
FIG. 6 is a schematic diagram of another connection between an intelligent video processing apparatus and an extension module according to an embodiment of the present disclosure.

FIG. 6 shows an implementation of a connection between the intelligent video processing apparatus 100 and the extension module 12N using a wireless connection technology. As shown in FIG. 6, a wireless power interconnection interface and an access port are disposed in the intelligent video processing apparatus 100, and a wireless power interconnection interface, a client, and a receiver are disposed in the extension module 12N. When the extension module 12N is connected to the intelligent video processing apparatus 100, the intelligent video processing apparatus 100 powers the extension module using the receiver of the extension module 12N. The extension module 12N may serve as a power supply receiver, or may serve as a wireless power supply transmitter, to implement a wireless power supply.

For data transmission, the intelligent video processing apparatus 100 has the access port, the extension module 12N has the client corresponding to the access port, and data transmission is implemented through a connection between the access port and the client. In addition, an access port on the extension module 12N may be connected to a client on another extension module to implement data transmission between the extension modules. In the present disclosure, wireless connection technologies may further include technologies such as WI-FI, BLUETOOTH, Infrared Data Association (IrDA), ZIGBEE, and UWB.

Example 4

Figure 7:
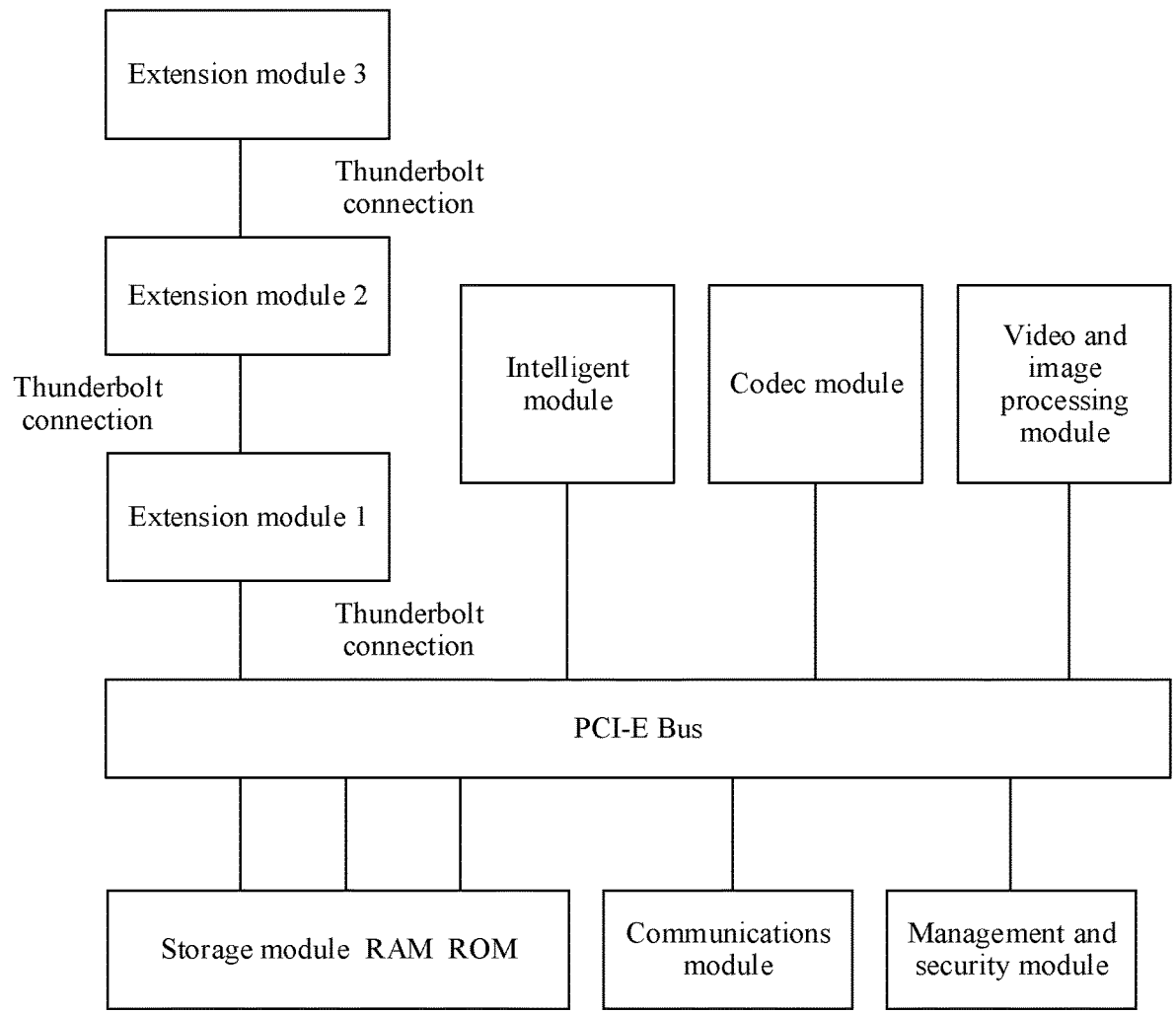
FIG. 7 is a schematic diagram of another connection between an intelligent video processing apparatus and an extension module according to an embodiment of the present disclosure.

FIG. 7 shows an implementation of a cascading system architecture of extension modules using a new technology (for example, a Thunderbolt technology). As shown in FIG. 7, provided that the intelligent module 120 serving as a control module transmits data through a PCI-E bus, internal data processing transmission of other modules (for example, the storage module 130 and the code module 150) in the intelligent video processing apparatus 100 is all performed through the PCI-E bus. Using the Thunderbolt technology and a corresponding interface, the extension module 12N may be connected to the intelligent module 120, and extension modules may also be connected to each other using the Thunderbolt technology.

Figure 8:
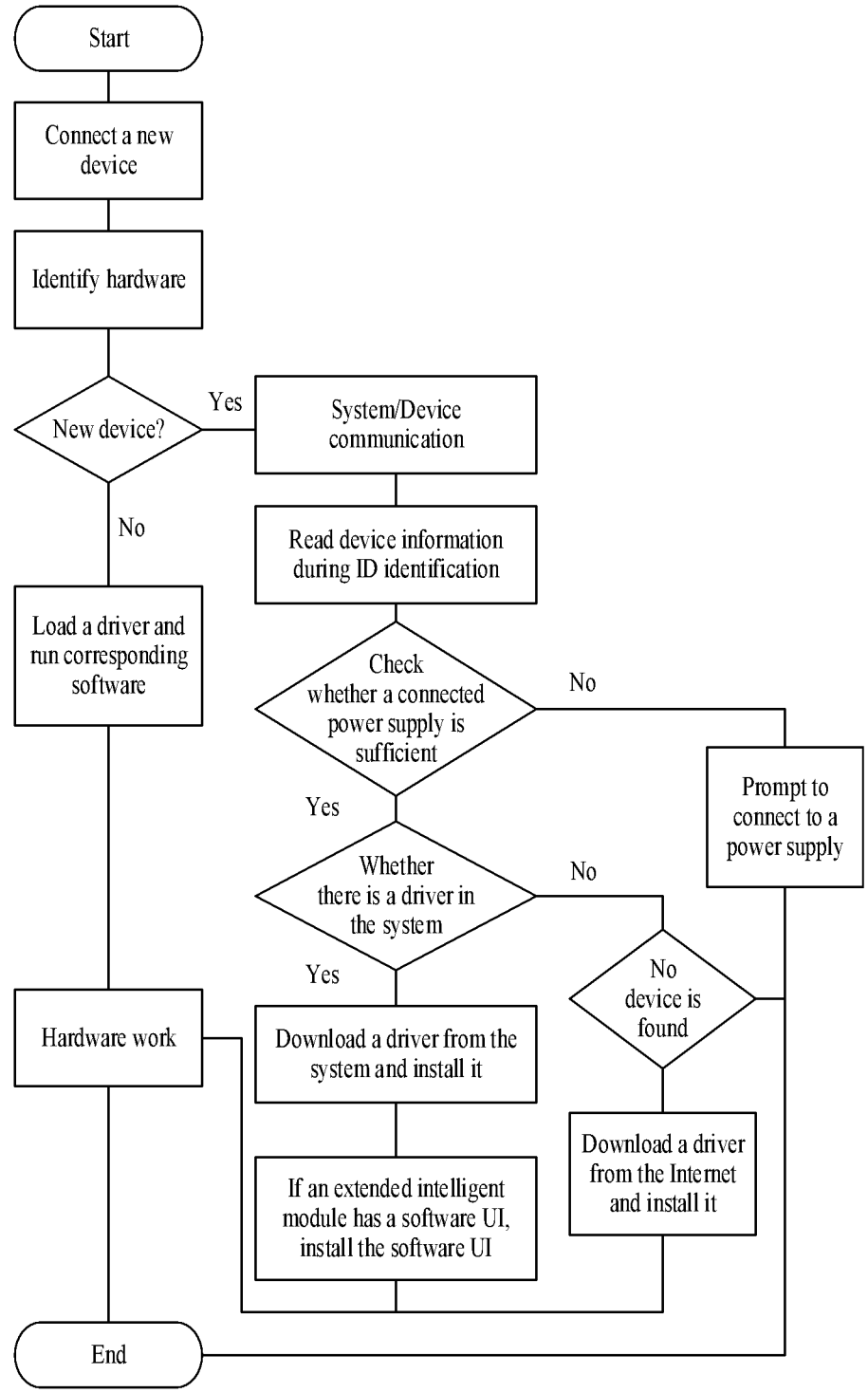
FIG. 8 is a possible working flowchart of an intelligent video processing apparatus according to an embodiment of the present disclosure.

The intelligent video processing apparatus 100 and the definable intelligent camera 200 provided in the embodiments of the present disclosure further include a power supply determining mechanism for a new extension module 12N. Power consumption information in a device identifier (ID) of the new extension module 12N is identified to determine that the intelligent video processing apparatus or another extension module connected to the new extension module 12N is to supply power. FIG. 8 shows a process of identifying a device ID of a new extension module 12N connected to the extensible intelligent camera or the intelligent video processing apparatus.

As shown in FIG. 8, when a connection needs to be established to a new extension module 12N, the intelligent video processing apparatus identifies a hardware ID of the extension module 12N and establishes communication with the extension module. Then a system (a system of the extensible intelligent camera or the intelligent video processing apparatus, similarly hereinafter) is searched for a registered driver, and the registered driver is compared with a driver of the extension module 12N, to confirm whether the extension module 12N is a new extension module. If the extension module 12N is not a new extension module, the registered driver is installed on the extension module 12N, to start the extension module 12N and end the current connection operation. If the extension module 12N is a new extension module, communication with the new extension module 12N is established, and information (for example, power information) of the new extension module 12N is read from the extension module. Then it is determined whether power supplied to the new extension module 12N is sufficient for the intelligent video processing apparatus or another extension module that is connected to the new extension module. If the power supply is insufficient, the system cancels the connection to the new extension module 12N, prompts the new extension module 12N to connect to a power supply, and then end the current connection operation. If the power supply is sufficient, the system looks for a driver of the new extension module 12N in a memory of the extension module. In the foregoing steps, if no driver of the new extension module 12N is found, it is prompted that no driver of the extension module is found. In this case, a user may download a driver of the extension module from the Internet or manually install a driver of the extension module 12N, and then install a registered driver on the extension module, to start the extension module 12N and finally end the current connection operation. In the foregoing steps, if a driver of the extension module is found, the system automatically downloads and installs the driver of the extension module 12N. In this case, if the new extension module 12N has an operating system subsystem, application software of the subsystem is installed. Finally, the current connection operation is ended.

The foregoing content mainly describes a constituent structure of the intelligent video processing apparatus and the intelligent camera provided in the embodiments of the present disclosure, and connection and operating modes of the extension module 12N and the intelligent video processing apparatus 100 or the intelligent camera 200. The following describes specific application scenarios of the definable intelligent camera and the intelligent video processing apparatus provided in the embodiments of the present disclosure, to further describe beneficial effects of the present disclosure.

Application 1: In some scenarios, a snapshot of a target needs to be taken in a linkage manner. When finding and focusing on the target, an intelligent camera with a larger surveillance scope needs to notify another intelligent camera around to take a snapshot in a linkage manner. A rule of a linkage between intelligent cameras may be flexibly specified as required, and the linkage rule is written into a definable intelligent camera using a communications module.

Figure 9:
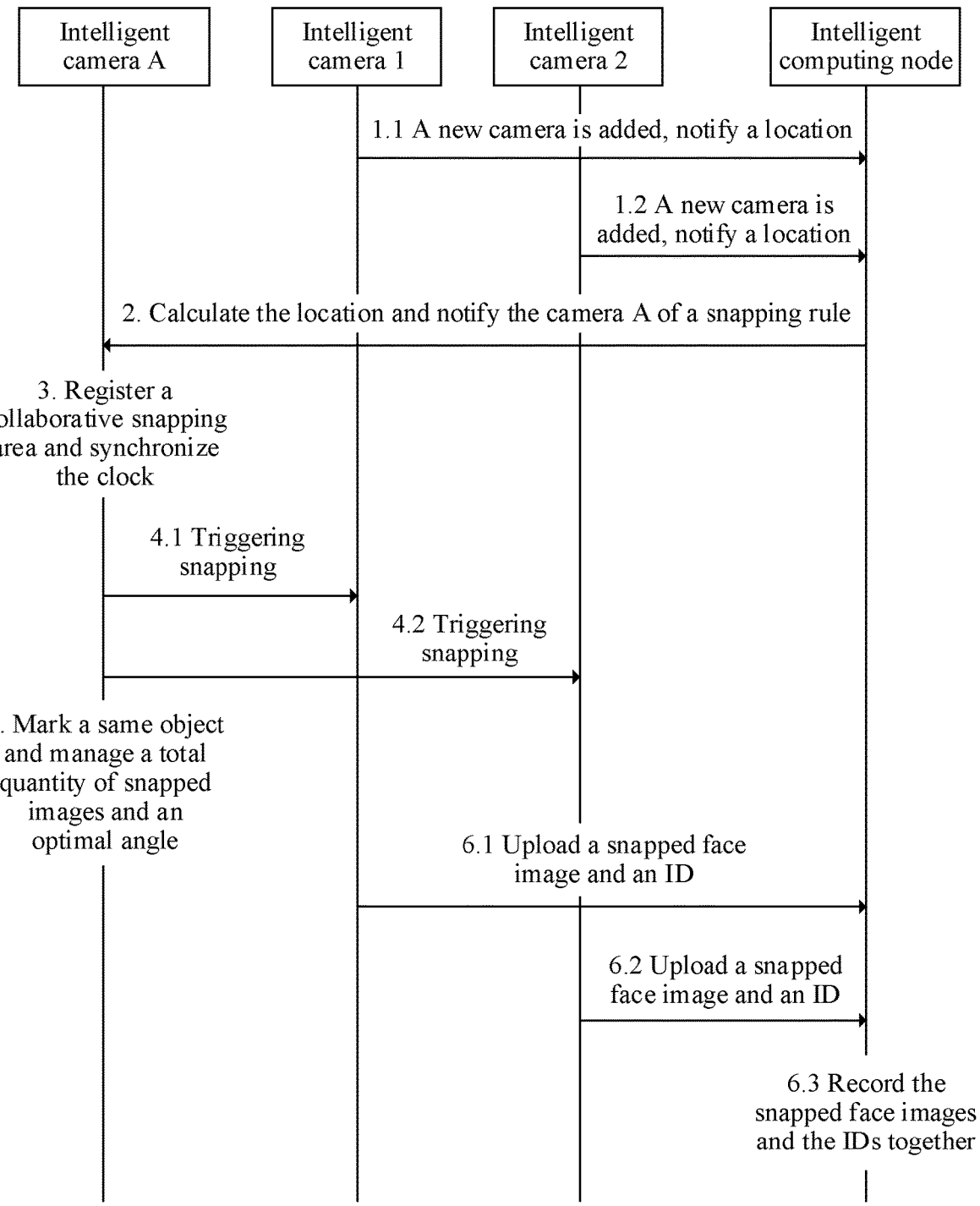
FIG. 9 is an application scenario of an intelligent video processing apparatus according to an embodiment of the present disclosure.

FIG. 9 shows functions of apparatuses in the scenario in the application 1 and a process of interaction between the apparatuses. When a new definable intelligent camera 1 is connected to the system, the intelligent camera 1 notifies a nearby intelligent computing node of its location information. The intelligent computing node herein may be disposed in an intelligent camera or an edge computing node. After receiving the location information of the newly connected intelligent camera 1, the intelligent computing node calculates a location based on longitude and latitude coordinate information, and notifies an intelligent camera A with a larger surveillance scope that a target human face is recognized in a surveillance area. In this case, the intelligent camera 1 or an intelligent camera 2 is triggered to take a snapshot. The intelligent camera A registers a cooperative snapping rule and a surveillance area for triggering snapping. When a target human face is detected, the intelligent camera 1 or 2 is triggered to take a snapshot. If snapped target human faces are a same target, the intelligent camera A denotes them as the same target, and manages a total quantity of images snapped under triggering and an optimal angle for snapping. After snapping an image of the human face, the intelligent camera 1 or 2 uploads the snapped image of the human face and a corresponding ID to the intelligent computing node.

Application 2: In some traffic surveillance scenarios, surveillance on new traffic violation events in video surveillance area needs to be added. Therefore, a new traffic rule determining function, and corresponding event recording and image snapping functions need to be injected. A user may write an algorithm of a newly implemented function into the definable intelligent camera or the intelligent video processing apparatus using the communications module according to a requirement of an application scenario. In this way, when a new traffic rule is launched, there is no need to replace all surveillance devices, but the new traffic rule is applicable based on the original devices. This can greatly reduce costs.

Figure 10:
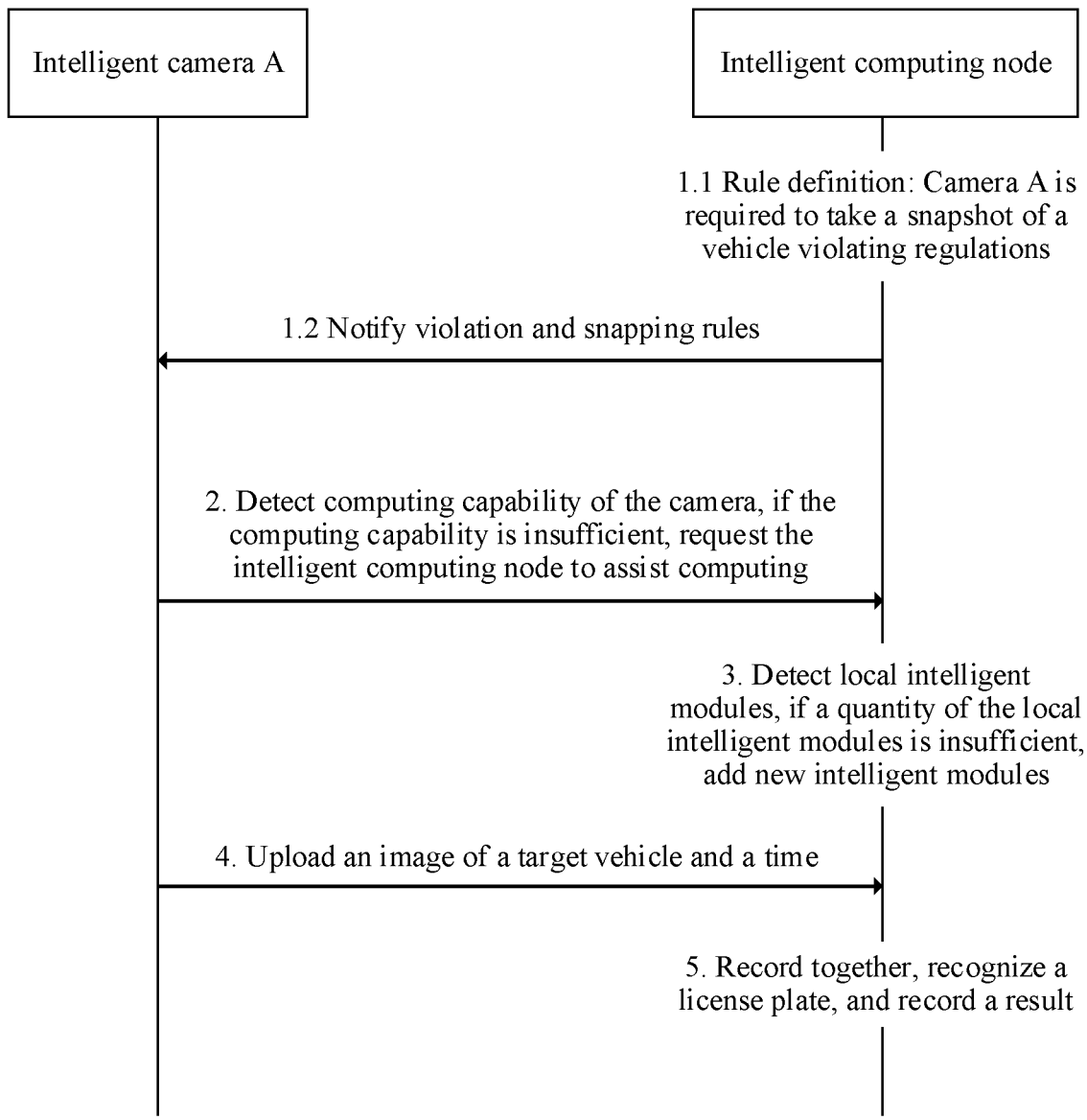
FIG. 10 is another application scenario of an intelligent video processing apparatus according to an embodiment of the present disclosure.

FIG. 10 shows a process of defining a rule for the intelligent camera in the application 2 and an operating process of the intelligent camera. An intelligent computing node writes, into the intelligent camera A, an algorithm corresponding to a defined rule. The intelligent node requires that the camera A snaps an image of an action of violating a new parking rule, that is, notifies the camera A that, a local area of a surveillance image becomes a yellow no-parking area, and the camera A needs to identify and snap an image of a vehicle that parks for more than 10 minutes, and record a time in real time. If the camera A detects that its intelligent analysis capability is insufficient, the camera A may request the intelligent computing node to assist in vehicle license plate recognition and computing. The intelligent computing node detects for local intelligent modules. If local intelligent modules are insufficient, more intelligent modules may be extended using the extension interface a. After detecting and snapping an image of a vehicle violating regulations, the intelligent camera A uploads the image and marks a time in real time. After receiving the image, the intelligent computing node recognizes vehicle information such as a vehicle license plate, and records a result and a time.

Application 3: A large quantity of requirements such as facial recognition, vehicle recognition, posture recognition, and behavior analysis are imposed in current intelligent video surveillance scenarios. Currently, deep learning is usually used to improve recognition and analysis performance. A deep learning algorithm is used to establish a neural mechanism for simulating analysis and learning performed by a human brain, construct a network structure model with a plurality of hidden layers, and train a large amount of data to obtain representative feature information in order to implement interpretation and prediction for data such as an image, a voice, or a text, and improve accuracy of classification prediction. In the image recognition field, a deep learning-based model, especially a convolutional neural network (CNN) model, is widely applied. The deep learning algorithm usually includes three steps: dataset construction, model training and generation, and image classification and recognition. A deep learning-based neural network model is trained and generated based on learning of a large quantity of image features. A neural network model with good performance is established based on a large amount of appropriate image data. Therefore, a suitable image database first needs to be constructed for the neural network to learn. Model and parameter training and generation mainly include two processes: training and testing. A constructed image dataset undergoes data conversion, and then is input as underlying data of a convolutional neural network. The convolutional neural network performs operations such as convolution and pooling on the data to output a network model. A result such as a parameter that describes model performance is observed, and a network model parameter is adjusted. It is learned that the output performance parameter is converged and tends to be in a stable state. Then the model training ends. Extracted image features are stored in the model. After the model is trained and generated, application performance of the model needs to be tested. Pictures may be centrally extracted from test pictures. A trained classification model is invoked to transmit test picture data through the network model, and finally, a comparison is performed on classification accuracy of the test data. If precision is relatively low, it indicates that the network model obtained through training does not reach an expectation, that is, the neural network parameter for deep learning is not optimal, and the network model needs to be further optimized to improve its test accuracy. There are mainly the following three methods for optimizing the neural network model: 1. Extend the image dataset for training. 2. Change a network structure of the model. 3. Adjust the network parameter of the model. After a neural network model and parameter with superb performance are obtained, they may be used in an actual image recognition application. In an application stage, first, a target in a surveillance scenario is preprocessed to extract, as an input of the neural network, feature information that can be used for recognition, and operations such as recognition and classification are performed on the feature information using the convolutional neural network model. When performance of the deep learning algorithm is improved, a required neural network model needs to be obtained through an update. A quantity of layers of a deep learning algorithm is increased from 20 to 30, and a quantity of neurons at some network layers is increased. A parameter of the deep learning algorithm is a latest parameter obtained through learning and training in various regions. A user may write, into the intelligent video processing apparatus, information such as a neural network model related to a video surveillance scenario or a latest deep learning parameter. If the intelligent video processing apparatus has an insufficient computing capability for the new deep learning algorithm, an intelligent module needs to be added to improve a computing capability of the intelligent video processing apparatus in order to meet a computing capability requirement of deep learning. A method for extending a new intelligent module has been described above, and details are not described herein again.

Application 4: In some scenarios, an error occurs in a fixed network, and image or video data needs to be transmitted in a wireless network access mode. When the fixed network is congested, a parameter is adjusted such that still image information in a surveillance scenario is compressed with a high compression ratio during encoding, to clearly present a changed part.

Figure 11:
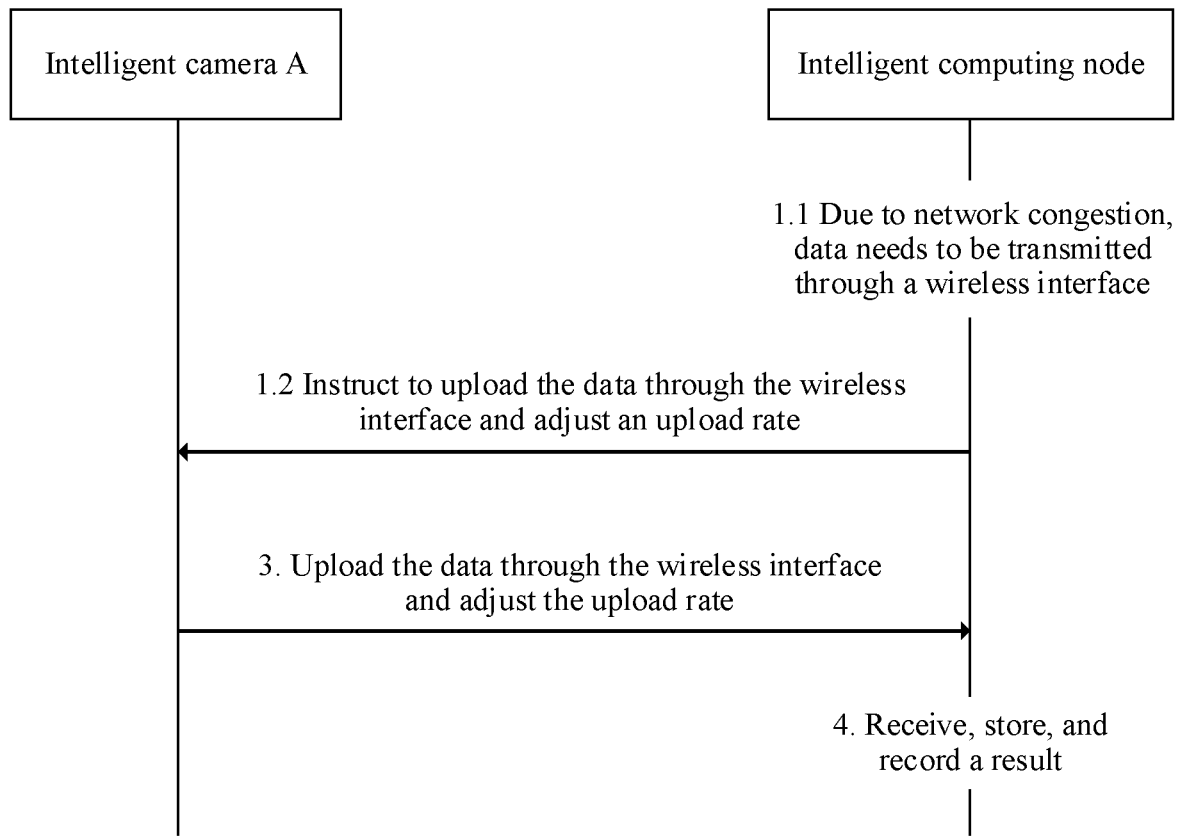
FIG. 11 is another application scenario of an intelligent video processing apparatus according to an embodiment of the present disclosure.

FIG. 11 shows a working process of adjusting an encoding parameter due to network congestion in the application 4. If a fixed network is congested, an intelligent computing node instructs a definable intelligent camera A to upload data through a wireless interface, and stipulates an upload rate. The intelligent camera A adjusts a frame rate according to an MPEG principle and based on a codec scheme such as H.264, H.265, or a national or industry standard of China. Further, the intelligent camera A may adjust an encoding parameter, for example, intensify encoding for a non-static area or weaken encoding for a static background area. After encoding is completed, the intelligent camera A selects a wireless interface for uploading data. Before uploading data, the intelligent camera A may further choose to check a security parameter, for example, whether a destination address is in a list of authorized addresses, and whether encryption is required in transmission or privacy information needs to be removed in transmission. After receiving the uploaded data, the intelligent computing node performs decoding and subsequent processing.

Currently, in various encoding algorithms, a video encoding rate may be dynamically adjusted according to the MPEG principle. Two main aspects may be combined for improving encoding of video surveillance.

Figure 12:
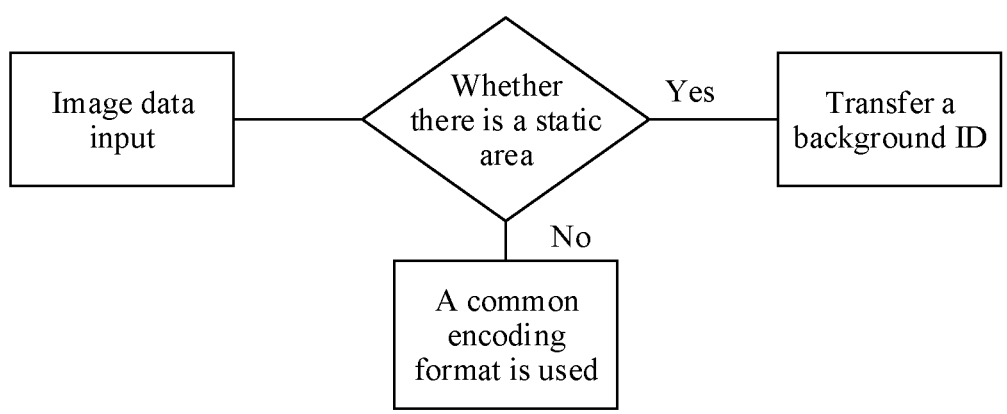
FIG. 12 is a codec scheme according to an embodiment of the present disclosure.

Aspect 1: A static background for video surveillance usually remains unchanged for a long time. During encoding of this scenario, the static background may be recognized as a long-time static area based on interframe changes, to reduce a codec rate and highlight a bit rate of other areas. FIG. 12 shows the working process. When an image encoding block is input, a background area that is static for a long time is recognized using an interframe comparison. It is detected whether there is a static area and no pixel change (or merely a light change) occurs in the static area. If there is no static area, encoding is performed according to an original encoding scheme. Alternatively, if there is a static area, a background identifier ID is transferred, and a pixel block corresponding to background frame is directly extracted in a decoding area. In a scenario with a light change, a background frame and a new ID may be defined every several frames.

Figure 13:
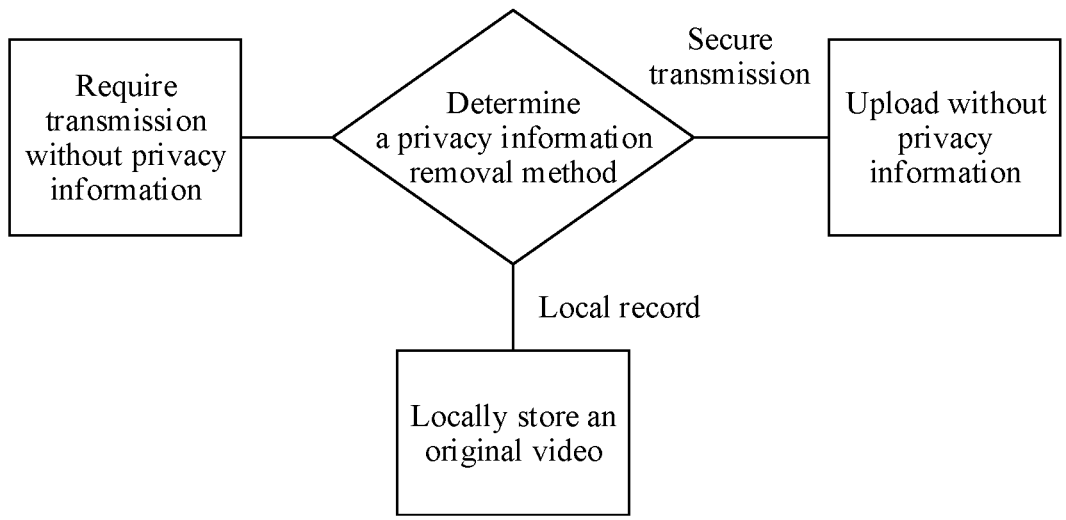
FIG. 13 is another codec scheme according to an embodiment of the present disclosure.

Aspect 2: For transmission security, FIG. 13 shows a process of removing privacy information from a video before transmission without encryption. In some surveillance scenarios, privacy information needs to be removed from a video before transmission, for example, in a scenario in which only crowd density or whether an old person falls down needs to be monitored. If a surveillance scenario imposes a requirement for removing privacy information, a method for removing privacy information is selected, for example, using a thermodynamic diagram without detailed facial information, or automatically applying mosaics to a face. Finally, an original video is stored locally and is completely sent when a network condition becomes good, privacy information is removed, and a video is uploaded.

It should be noted that although the embodiments of the present disclosure describe how to use the definable intelligent camera A and the definable intelligent camera 1 or 2 in the foregoing application scenarios, functions of these intelligent cameras may be alternatively implemented by a combination of a common camera and the intelligent video processing apparatus.

In an optional manner, a management and security module 160 is further disposed in the intelligent video processing apparatus 100 provided in this embodiment of the present disclosure. The management and security module 160 is configured to manage data security of the intelligent video processing apparatus 100, to prevent Internet hackers from attacking the intelligent video processing apparatus 100 to obtain image/video data or an intelligent analysis result. The management and security module 160 may be an independent hardware entity. Alternatively, a function of the management and security module 160 may be integrated in the intelligent module 120 or an extension module. In this case, the management and security module 160 merely serves as a logical component, but not an independent hardware entity.

To prevent attacks from Internet hackers, a security control list and a security control point are added in this embodiment of the present disclosure, and remote setting or secondary authentication and licensing may be performed using signaling of a wireless network or a management plane of a fixed network. In this embodiment of the present disclosure, a control stream received by the communications module is used to control a destination address list of a data stream such that the data stream is not transmitted to an address for illegal attacking. The management and security module 160 may store the security control list, to manage a data flow direction of the intelligent video processing apparatus 100, perform authentication-related key computing, and the like.

In this embodiment of the present disclosure, the security control list is a management list of the system for external devices. The list may include an external device allowed to access system data, or a device allowed to invoke system hardware, or a system-allowed destination address for data sending. The security control list may record any information that can represent an identity of an external device, for example, a media access control (MAC) address or an IP address of the external device, or another number according to a related standard of a country.

The security control point is a node selected in a data transmission path in the system of the intelligent video processing apparatus 100. The node manages data or control information passing the node, and determines whether transmitted data conforms to system-stipulated security. Authentication and control are two main operations performed by the system at the security control point. A user may define, according to an actual requirement, a quantity of security control points and operations that need to be performed at the security control points.

The security control list may be set in at least one of a list of licensed addresses is written from the communications module to the intelligent video processing apparatus, a password/key/mechanism for authentication is written from the communications module, and local verification is performed, where the verification process may be performed by the management and security module 160, and when necessary, the intelligent module 120 may perform a complex security operation separately or together with the management and security module 160, or a device requesting a connection may read data from the communications module only after licensing, where the communications module may perform external secondary authentication, or an administrator may perform licensing and confirmation.

Figure 14:
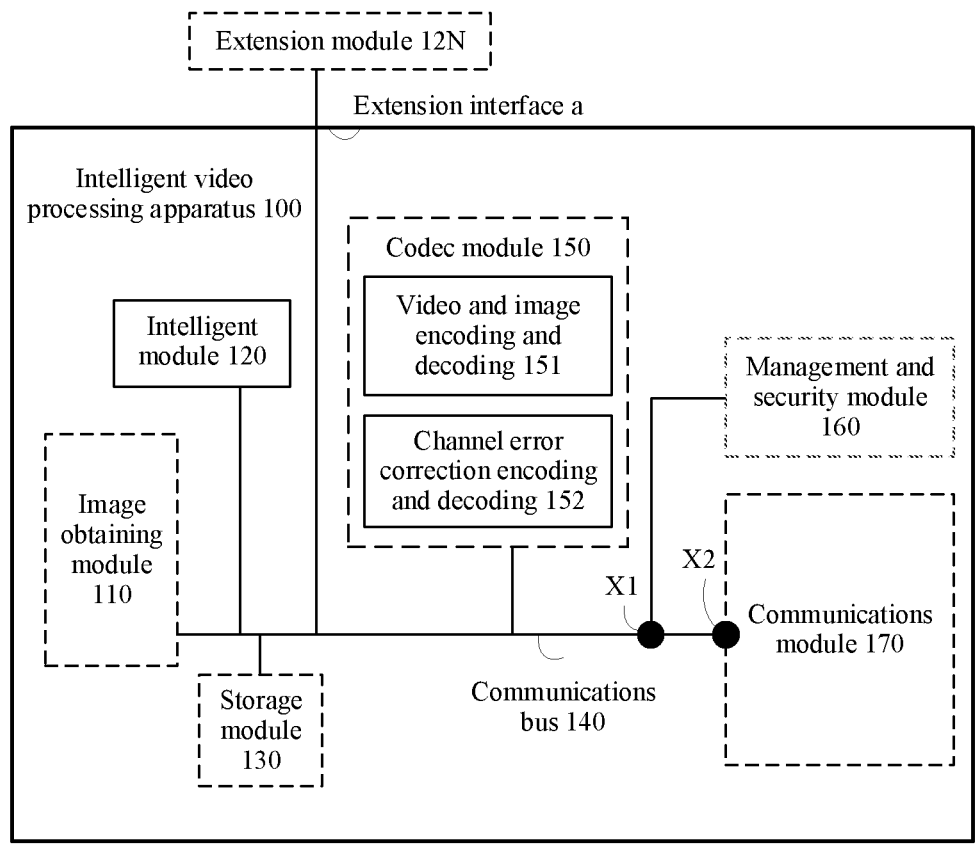
FIG. 14 is a schematic diagram of a control point in an intelligent video processing apparatus according to an embodiment of the present disclosure.

As shown in FIG. 14, two security control points are set in the system of the intelligent video processing apparatus 100. Using a control point X1 as an example, the following describes functions that can be implemented by the security control points and their working modes.

The system mainly performs two operations at the control point X1 authentication and control. When a data stream passes the control point X1, a destination address of the data stream may be obtained at the control point X1, and it is determined whether the data stream needs to be transmitted, whether the data stream needs to be encrypted for transmission, and whether to select wired transmission or wireless transmission. In addition, the security control list may be further searched for the destination address of the data stream to determine whether authentication succeeds. If the destination address is not recorded in the security control list or is recorded in a security control list that is a transmission-prohibited list, the communications module may perform external secondary authentication, or an operator may perform licensing and confirmation. Setting an authentication step for data stream transmission can maximally prevent a data stream from being transmitted to an unauthorized destination address, thereby improving data security.

The system may further control and manage other modules in the system at the control point X1. For example, when receiving external configuration information from the communications module, the control point X1 may notify other modules of a working mode of the system and corresponding control information such that the modules perform corresponding operations. A definable system working mode may be key image snapping, a night mode, a power saving mode, low-bandwidth transmission with compression, a privacy information removal mode, or the like.

The control point X1 may further determine whether a local user password needs to be used for encryption when data is written into the storage module 130. The control point X1 may further record access and operations of a remote device for the intelligent video processing apparatus 100, to determine a device risk, find out an unauthorized operator after an event occurs, or the like. For an operation that may cause a system risk, the X1 control point may further determine whether the operation is authenticated. When necessary, the management and security module 160 may be further used to perform secondary authentication, or an operator is required to perform manual confirmation.

A purpose of setting the management and security module 160, the security control list, and the security control points in this embodiment of the present disclosure is to authenticate a data flow direction of the intelligent video processing apparatus 100, and determine whether an operation performed by an external device on the intelligent video processing apparatus 100 or the definable intelligent camera 200 is authenticated. These two aspects ensure data security and system security of the intelligent video processing apparatus 100 or the definable intelligent camera 200, to prevent data from flowing to an unauthorized destination address and prevent an external device from remotely controlling the intelligent video processing apparatus 100 or the definable intelligent camera 200 without authorization.

Functions and operations performed by several other security control points in FIG. 14 are similar to those of the control point X1. A user may perform configuration flexibly according to an actual requirement. Details are not described herein again.

To sum up, an embodiment of the present disclosure provides an intelligent video processing apparatus 100, mainly including an image obtaining module 110, an intelligent module 120, an extension interface a, and a communications module. The intelligent module in this embodiment of the present disclosure not only performs an intelligent analysis function, but also serves as a control center of the entire apparatus. A new extension module is installed on the intelligent video processing apparatus using the intelligent module extension interface as required such that the new extension module may become a part of the apparatus. In addition, the communications module may be further used to write various types of control information into the intelligent video processing apparatus such that the intelligent video processing apparatus can implement more functions. The intelligent video processing apparatus may be combined with various front-end devices, to form an intelligent video surveillance system that can adapt to requirements of different scenarios.

On a basis of the intelligent video processing apparatus, an embodiment of the present disclosure further provides a definable intelligent camera. The extensible intelligent camera integrates the foregoing intelligent video processing apparatus in a camera, and a front-end module for video collection is added, and provides functions of the foregoing intelligent video processing apparatus. According to requirements of different applications, corresponding applications can be developed, and extension modules can be added, to improve a computing capability of the intelligent camera.

To be specific, the intelligent video processing apparatus and the definable intelligent camera in the embodiments of the present disclosure provide an open platform such that a hardware manufacturer does not need to develop custom intelligent cameras for different scenarios or different application requirements, but only needs to focus on development of corresponding software. The corresponding software may be written into the intelligent video processing apparatus or the definable intelligent camera. In addition, a hardware manufacturer or a user may further choose to extend a new intelligent module according to a specific protocol or standard, to further extend a computing capability and application scenarios of the intelligent video processing apparatus and the definable intelligent camera. The intelligent video processing apparatus and the definable intelligent camera provided in the embodiments of the present disclosure improve extensibility of hardware, enlarge an application scope of hardware, and reduce costs for repeatedly developing hardware.

Although the present disclosure is described with reference to the embodiments, in a process of implementing the present disclosure that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although the present disclosure is described with reference to specific features and the embodiments thereof, obviously, various modifications and combinations may be made to them without departing from the spirit and scope of the present disclosure. Correspondingly, the specification and accompanying drawings are merely exemplary description of the present disclosure defined by the accompanying claims, and is considered as any of or all modifications, variations, combinations or equivalents that cover the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:
1. A camera comprising:
an image obtaining system comprising a lens and a sensor, and configured to obtain an image or video data;
at least one type of embedded processor coupled to the image obtaining system and configured to perform intelligent analysis and processing on the image or the video data, wherein the at least one type of embedded processor comprises a central processing unit (CPU), a digital signal processor (DSP), an application-specific integrated circuit (ASIC), or a field-programmable gate array (FPGA);
a communications interface coupled to the at least one type of embedded processor and configured to:
receive, from an external device, configuration information; and
send the configuration information to a target embedded processor of the at least one type of embedded processor according to a requirement of an application scenario, wherein the configuration information is configured to be modified according to the requirement, and wherein the configuration information extends a function of the camera and comprises at least one of:
a deep learning—based neural network model;

location topology information and control information for multi-camera cooperation;
a security control list; or
a control action indication; and
an extension interface configured to couple an extension device to the camera,
wherein the extension device is an intelligent processor that comprises an algorithm code according to the requirement of the application scenario,
wherein the at least one type of embedded processor coupled to the image obtaining system by the extension interface, and
wherein the extension interface comprises a a Universal Serial Bus (USB) interface or a thunderbolt interface.

2. The camera of claim 1, wherein the communications interface is a wireless communications interface.

3. The camera of claim 1, further comprising a security and management system coupled to the communications interface and configured to:
manage data and system security of the camera by setting a security control point in a data transmission path of the camera to perform authentication on transmitted data; and
store the security control list comprising a management list of the camera for external devices and comprising information about the external devices allowed to access system data of the camera.

4. The camera of claim 1, wherein the extension interface is further configured to implement communication between the at least one type of embedded processor and the extension device.

5. The camera of claim 4, wherein the camera is configured to:
authorize the extension device; and
use the extension device as a node to control another extension device.

6. The camera of claim 4, further comprising a software system configured to install a software driver of the extension device to manage the extension device.

7. The camera of claim 4, wherein the extension device is a communications interface, a storage device, or an intelligent processor.

8. The camera of claim 4, wherein the extension interface is further configured to implement communication between the camera and the extension device using a Transmission Control Protocol (TCP)/Internet Protocol (IP) communication technology or a User Datagram Protocol (UDP) technology.

9. The camera of claim 4, wherein the extension interface is further configured to implement communication between the camera and the extension device using a wireless communications technology, and wherein the wireless communications technology comprises a Wi-Fi technology, a ZIGBEE technology, or a BLUETOOTH technology.

10. A camera operating method applied to a camera comprising an image obtaining system, at least one type of embedded processor, and a communications interface, wherein the camera operating method comprises:
generating, by the image obtaining system, an image or video data;
performing, by the at least one type of embedded processor coupled to the image obtaining system, intelligent analysis and processing on the image or the video data, wherein the at least one type of embedded processor comprises a central processing unit (CPU), a digital signal processor (DSP), an application-specific integrated circuit (ASIC), or a field-programmable gate array (FPGA);
receiving, by the communications interface coupled to the at least one type of embedded processor, configuration information from an external device and sending the configuration information to a target embedded processor of the at least one type of embedded processor according to a requirement of an application scenario, wherein the configuration information is configured to be modified according to the requirement, and wherein the configuration information extends a function of the camera and comprises at least one of:
a deep learning—based neural network model;
location topology information and control information for multi-camera cooperation;
a security control list; or
a control action indication; and
coupling, by an extension interface comprised in the communications interface, an extension device to the camera,
wherein the extension device is an intelligent processor that comprises an algorithm code according to the requirement of the application scenario,
wherein the at least one type of embedded processor coupled to the image obtaining system by the extension interface, and
wherein the extension interface comprises a a Universal Serial Bus (USB) interface or a thunderbolt interface.

11. The camera operating method of claim 10, wherein the communications interface is a wireless communications interface.

12. The camera operating method of claim 10, wherein the communications interface is a fixed communications interface.

13. The camera operating method of claim 10, further comprising:
managing, by a security and management system of the camera, data and system security of the camera by setting a security control point in a data transmission path of the camera to perform authentication on transmitted data; and
storing, by the security and management system, the security control list comprising a management list of the camera for external devices and comprising information about the external devices allowed to access system data of the camera.

14. The camera operating method of claim 10, further comprising implementing, by the extension interface, communication between the camera and the extension device.

15. The camera operating method of claim 14, further comprising constructing the extension device to be authorized by the camera.

16. The camera operating method of claim 14, wherein the extension device is a communications interface, a storage device, or an intelligent processor.

17. The camera operating method of claim 14, further comprising implementing, by the extension interface, communication between the camera and the extension device using a Transmission Control Protocol (TCP)/Internet Protocol (IP) communication technology.

18. A computer program product comprising computer-executable instructions that are stored on a non-transitory computer readable storage medium and that, when executed by a processor, cause a camera to:
generate, by an image obtaining system, an image or video data, wherein the camera comprises the image obtaining system, at least one type of embedded processor, and a communications interface;

perform, by the at least one type of embedded processor coupled to the image obtaining system, intelligent analysis and processing on the image or the video data, wherein the at least one type of embedded processor comprises a central processing unit (CPU), a digital signal processor (DSP), an application-specific integrated circuit (ASIC), or a field-programmable gate array (FPGA);

receive, by the communications interface coupled to the at least one type of embedded processor, configuration information from an external device and send the configuration information to a target embedded processor of the at least one type of embedded processor according to a requirement of an application scenario, wherein the configuration information is configured to be modified according to the requirement, and wherein the configuration information extends a function of the camera and comprises at least one of:

a deep learning—based neural network model;

location topology information and control information for multi-camera cooperation;

a security control list; or a control action indication; and couple, by an extension interface comprised in the communications interface, an extension device to the camera, wherein the extension device is an intelligent processor that comprises an algorithm code according to the requirement of the application scenario, wherein the at least one type of embedded processor coupled to the image obtaining system by the extension interface, and wherein the extension interface comprises a a Universal Serial Bus (USB) interface or a thunderbolt interface.

19. The computer program product of claim 18, wherein the communications interface is a wireless communications interface.

20. The computer program product of claim 18, wherein the communications interface is a fixed communications interface.

* * * * *

UNITED STATES PATENT AND TRADEMARK OFFICE
CERTIFICATE OF CORRECTION

PATENT NO. : 11,869,322 B2  
APPLICATION NO. : 17/689346  
DATED : January 9, 2024  
INVENTOR(S) : Yan Zhou and Aijun Zhang Page 1 of 1

It is certified that error appears in the above-identified patent and that said Letters Patent is hereby corrected as shown below:

In the Claims

Claim 1, Column 21, Line 13: "wherein the extension interface comprises a a Universal" should read "wherein the extension interface comprises a Universal"

Claim 10, Column 22, Line 28: "wherein the extension interface comprises a a Universal" should read "wherein the extension interface comprises a Universal"

Claim 18, Column 24, Line 13: "wherein the extension interface comprises a a Universal" should read "wherein the extension interface comprises a Universal"

Signed and Sealed this  
Twenty-seventh Day of February, 2024

Katherine Kelly Vidal  
*Director of the United States Patent and Trademark Office*